(12) United States Patent
Nishimura et al.

(10) Patent No.: US 8,678,597 B2
(45) Date of Patent: Mar. 25, 2014

(54) PROJECTION TYPE DISPLAY DEVICE

(75) Inventors: Yoshifumi Nishimura, Tokyo (JP);
Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 251 days.

(21) Appl. No.: 13/138,727

(22) PCT Filed: Mar. 30, 2009

(86) PCT No.: PCT/JP2009/056467
§ 371 (c)(1),
(2), (4) Date: Sep. 22, 2011

(87) PCT Pub. No.: WO2010/116444
PCT Pub. Date: Oct. 14, 2010

(65) Prior Publication Data
US 2012/0013854 A1    Jan. 19, 2012

(51) Int. Cl.
*G03B 21/14*    (2006.01)
(52) U.S. Cl.
USPC .................. 353/61; 353/119; 353/84; 353/60
(58) Field of Classification Search
USPC .................. 353/57, 58, 60, 61, 119; 349/5–9; 348/742, 743, 771
See application file for complete search history.

(56) References Cited

U.S. PATENT DOCUMENTS

| | | | |
|---|---|---|---|
| 2006/0170876 A1* | 8/2006 | Takemi et al. | 353/61 |
| 2007/0024815 A1* | 2/2007 | Oyama | 353/54 |

FOREIGN PATENT DOCUMENTS

| | | |
|---|---|---|
| JP | 10-221779 A | 8/1998 |
| JP | 2002-318423 A | 10/2002 |
| JP | 2003-241310 A | 8/2003 |
| JP | 2005-292680 A | 10/2005 |

OTHER PUBLICATIONS

International Search Report in PCT/JP2009/056467 dated Jun. 9, 2009 (English Translation Thereof).
Japanese Office Action dated Jun. 4, 2012, with partial English translation.

* cited by examiner

*Primary Examiner* — William C Dowling
(74) *Attorney, Agent, or Firm* — McGinn IP Law Group, PLLC

(57) ABSTRACT

It is possible to reliably prevent dust particles from becoming attached to optical components and it is also possible to suppress temperature rises in optical components. A projection type display device according to the present invention includes a plurality of optical components (20, 21, 24, 30, and so on), a hollow structure (45, 50, or the like), and an air blow source (19, 46, or the like). The plurality of optical components are provided along the optical axis direction of light emitted from a light source. The hollow structure includes optical components (20, 24) that are to be protected from the attachment of dust particles to optical components among the plurality of optical components, and forms an enclosed space separated from the surroundings. Then, the source that blows air is provided in the inside of the enclosed space to circulate the internal air for cooling targets.

18 Claims, 18 Drawing Sheets

PROJECTION TYPE DISPLAY DEVICE

TECHNICAL FIELD

The present invention relates to a projection type display device equipped with a dustproof structure that prevents dust particles from attaching to optical components.

BACKGROUND ART

In conventional projection type display devices, there is a device that obtains dustproof effect by covering the entire device with a protection case (for example, see Patent Document 1). In addition, as devices that target particular components mounted on the device, not the entire device, there is a device that reduces the attachment of dust particles to a light tunnel or color wheel, (Patent Document 2), and there is a device that cleans a rod integrator soiled due to the attachment of dust particles (Patent Document 3).

In the following, these examples of conventional dustproof techniques will be described.

The technique disclosed in Patent Document 1 is one in which the entire device is enclosed and dust-proofed using a protection cabinet mounted with an air filter and air intake fans. The outside air is admitted by the air intake fans through the air filter, dust particles contained in the air are removed, and then the air is delivered to the entire device. Because all the air admitted passes through the air filter, the entire device can be dust-proofed.

The technique disclosed in Patent Document 2 is one in which unnecessary light, when light enters the light tunnel or color wheel is shielded with a light shielding plate, and thermal storage due to the light received on the light shielding plate is moved to the outside of a mirror chamber for heat dissipation. Because temperature rises in the light tunnel, the color wheel, and the air in the inside of the mirror chamber can be suppressed, the internal airflow is reduced, and consequently, airborne dust particles are prevented from becoming attached to optical components.

The technique disclosed in Patent Document 3 is in which that a cleaning pad is operated by a mechanical means for physically cleaning the light emitting face of the rod integrator.

[Patent Document 1] JP-A-2003-241310 (page 6, FIG. 1, page 7, and FIG. 5)

[Patent Document 2] JP-A-2002-318423A (page 1 and FIG. 2)

[Patent Document 3] JP-A-2005-292680A (page 6 and FIGS. 1 and 2)

However, in the technique disclosed in Patent Document 1, the air filter is used, and an air filter having a fine mesh is necessary in order to remove dust particles in a small particle size. However, because the air filter having a fine mesh collects dust particles in a middle or large particle size, too, the air filter tends to be clogged and has a high ventilation resistance. What is required is to increase the filter area in order to reduce ventilation resistance, so that a large-sized air filter is necessary. Moreover, this technique requires that the air intake quantity be in creased in order to dust-proof the device and also requires that plurality of large-sized or middle-sized fans be used that can secure large quantity of air.

Furthermore, if the device is installed in adverse dust particle environments, the air filter is sometimes clogged even though a large-sized air filter is used. When the air filter is clogged, it is not possible to deliver sufficient tempering air to components in the inside of the device, causing temperature rises in the components, so that the lifetime of the components shortens. Many optical components are particularly sensitive to temperature, and they deteriorate considerably due to temperature rises, causing color irregularities or a reduction in brightness in projection images.

In other words, the protection cabinet enclosing the entire device is large and heavy, and the protection cabinet is also required to have high sealing properties in order to prevent air intake other than through the air filter. In addition, in adverse dust particle environments, it is also likely to clog the air filter.

On the other hand, the structure disclosed in Patent Document 2 does not operate in the case where there are no dust particles near the light tunnel or color wheel, and if dust particles are present, the structure can reduce the attachment of dust particles to the optical components, but the structure cannot completely prevent particles from becoming attached to the optical components. In addition, because the light other than the unnecessary light is incident on optical components such as the light tunnel or color wheel, it is not possible to reduce temperature rises in the components caused by this light. In reality, because the temperature rises in these optical components are greatly caused by necessary light except unnecessary light for the light projection, a large temperature rise occurs when the internal airflow is reduced, sometimes leading to the deterioration or destruction of the optical components.

Moreover, the technique disclosed in Document 3 is one in which the cleaning pad is contacted with the light emitting face of the rod integrator for cleaning, so that the light emitting face is sometimes damaged when the cleaning pad wipes dust particles. This particularly tends to occur in the case where dust particles are sand dust, and in the case where the light emitting face is damaged, there is a problem in that brightness is considerably reduced because light is diffused. Furthermore, it is necessary to provide a space for mounting the mechanical means that operates the cleaning pad, causing a high probability of malfunction because of the provision of a plurality of operating units.

DISCLOSURE OF THE INVENTION

An example of an object of the present invention is to provide a projection type display device that can solve the foregoing problems of the Background Art.

An aspect of the present invention is a projection type display device that includes a plurality of optical components, a structure, and an air blow source.

A part of the plurality of optical components is enclosed and accommodated in the inside of the structure, and the air blow source circulates a gas in the inside of the structure.

According to this aspect, it is possible to reliably prevent dust particles from becoming attached to optical components, and it is also possible to suppress temperature rises in optical components.

DESCRIPTION OF REFERENCE NUMERALS AND SIGNS

Figure 1:
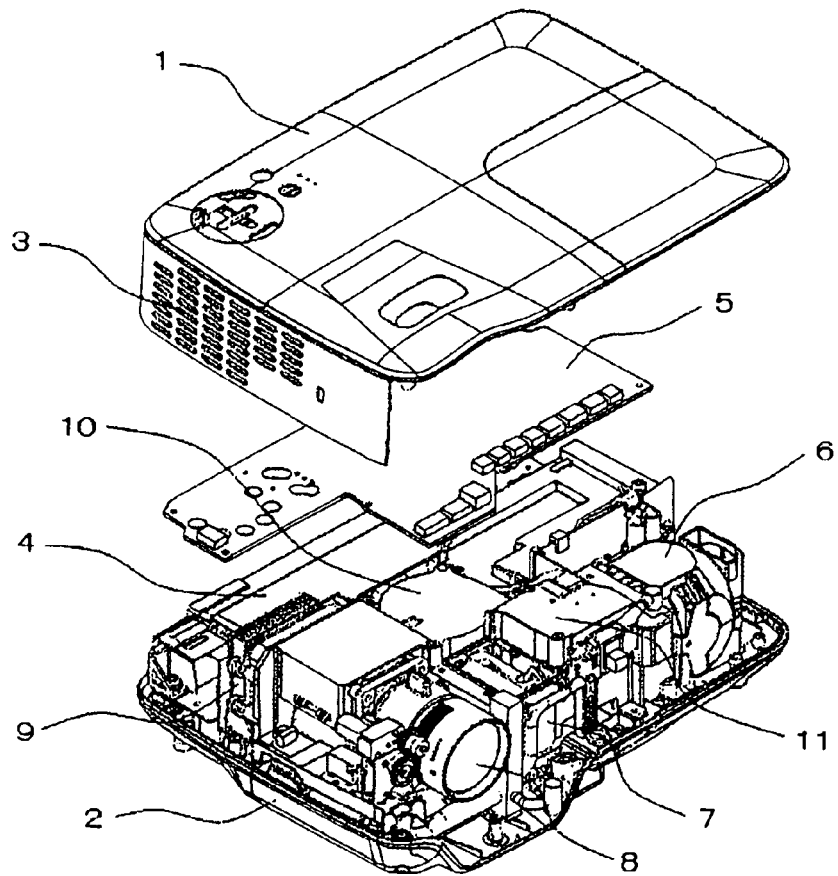
FIG. 1 is a perspective view depicting a projection type display device according to an embodiment of the present invention shown in the exploded state.

1 Upper cabinet
2 Bottom cabinet
3 Air intake opening
4 Power supply unit
5 Main substrate
6 Lamp unit
7 Optical engine
8 Projection lens
10 Sirocco fan
11 Duct
12 Heat exchanger
13 Optical engine base
14 Optical engine cover
19 Sirocco fan
20 Light tunnel
21, 22 Condensing lens
23 Mirror
24 Color wheel
30 Glass plate
31 Light tunnel adjustment base
32 Partition plate
33 Condensing lens mounting plate
34 Ventilation port
35 Color wheel motor
36 Color wheel motor shaft
37 Duct cover
37 Optical axis
50, 51, 52, 53, 54, 55 Wall surface
41, 42 Ventilation port
43 Opening (ventilation gap)
44 Partition plate
45 Casing
46 Axial flow fan
60, 61 Heat exchanger A
62, 63, 65 Heat sink (heat radiating fin)

BEST MODE FOR CARRYING OUT INVENTION

In the following, embodiments of the present invention will be described with reference to the drawings. In the explanation below, the terms "upper" and "lower" mean "upper" and "lower" in the typical installation posture of the projection type display device (in the installation posture on the surface of a stage such as a desk, for example). In addition, the terms "left" and "right" mean "left" and "right" with respect to the "upper" and "lower" direction described above.

First Embodiment

FIG. 1 is a perspective view depicting a projection type display device according to an embodiment of the present invention shown in the exploded state. The display device according to this embodiment includes upper cabinet 1 and lower cabinet 2 in a recessed shape, having power supply unit 4, main substrate 5, lamp unit 6, optical engine 7, projection lens 8, DMD unit 9, sirocco fan 10, duct 11, and the like in the inside of the space formed by combining upper cabinet 1 and lower cabinet 2. In addition, in FIG. 1, the display device is shown, from which upper cabinet 1 and main substrate 5 are removed upward.

When electric power is supplied from the outside of the display device to power supply unit 4, the power supply part in power supply unit 4 supplies electric power to a ballast (not shown) and main substrate 5. When a user of the device presses a button switch (not shown) provided on the rear of the right side surface of upper cabinet 1, the device is activated, and the ballast provided in power supply unit 4 stably emits light from a lamp mounted on the inside of lamp unit 6.

The emitted light goes to the inside of optical engine 7, and is applied to an image generating device DMD in DMD unit 9 through a plurality of optical components mounted on the inside of the optical engine. On the other hand, the DMD is driven according to picture signals inputted from the outside of the device, and generates images by reflecting the applied light. Lastly, the generated images are enlarged by projection lens 8, and projected onto a screen.

The display device according to this embodiment uses DMD (Digital Micromirror Device) as an image generating means. However, the device is not limited thereto. It may be possible to use a liquid crystal light valve.

In addition, in a series of operations concerning projection as described above, temperature rises occur in electronic components and optical components caused by self-heating or heat absorption. When the temperature of these components is increased, deterioration of the components is accelerated, resulting in a reduction in performance or destruction. Thus, it is necessary to suppress temperature rises in the components, and the display device according to this embodiment is air-cooled using a cooling fan.

Because of this, sirocco fan 10 for cooling the lamp and an exhaust fan (not shown) are mounted on the inside of the display device. Tempering air generated by sirocco fan 10 is supplied to lamp unit 6 through duct 11. The exhaust fan is mounted on the rear of the left side surface of the device, and evacuates the air after cooling the mounted components to the outside of the device. As shown in FIG. 1, upper cabinet 1 has air intake opening 3 defined therein, through which cooling air is admitted from the outside.

Figure 2:
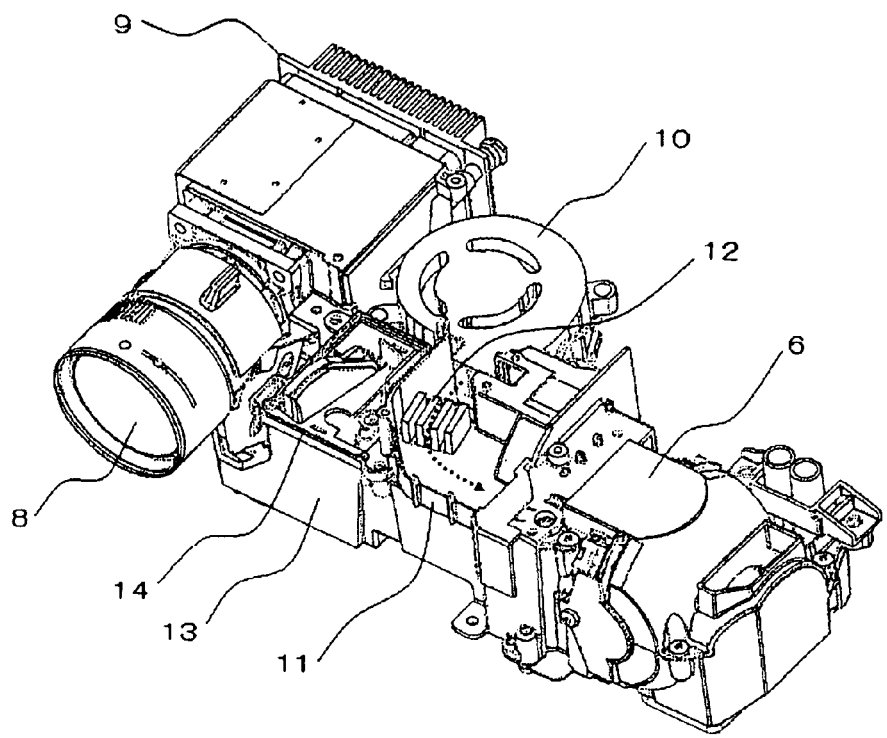
FIG. 2 is an enlarged perspective view depicting the projection type display device according to an embodiment of the present invention showing an optical engine and units therearound.

FIG. 2 is an enlarged perspective view depicting optical engine 7 and units therearound in the display device according to this embodiment. In the same drawing, the state is shown in which the upper cover of duct 11 is removed and a flow of tempering air delivered from sirocco fan 10 to lamp unit 6 is indicated by a dotted line.

In optical engine 7, a plurality of optical components, through which the light of lamp unit 6 passes, are mounted on optical engine base 13, and covered with optical engine cover 14 from above. Moreover, heat exchanger 12 removes heat from the air that causes a temperature rise in the inside of optical engine 7, and the heat is dissipated by tempering air passing through the inside of duct 11. This tempering air flows as is to lamp unit 6, and is used for cooling the lamp.

Figure 3:
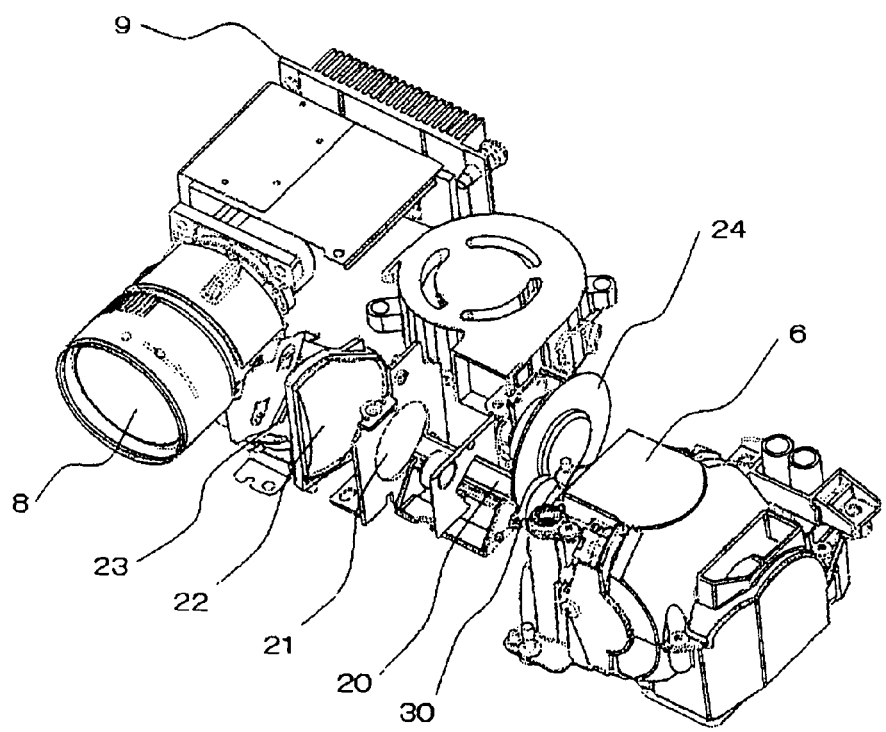
FIG. 3 is a diagram depicting the state in which a heat exchanger, a duct, and an optical engine cover are removed and an optical engine base is not shown in the configuration shown in FIG. 2.

FIG. 3 is a diagram depicting the state in which heat exchanger 12, duct 11, and optical engine cover 14 are removed and optical engine base 13 is not shown.

Referring to FIG. 3, a plurality of optical components mounted on the inside of optical engine 7 will be described.

The light emitted from lamp unit 6 enters glass plate 30, on which an AR Coating (Anti Reflection Coating) is applied on the surface. After that, the light passes through color wheel 24 that is an optical filter divided into a plurality of colors, and then enters light tunnel 20 that is a rod integrator. In the inside of light tunnel 20, the light coming from one end repeats reflection for a plurality of times in the inner wall surface, and goes out from the other end. The light emitted from light tunnel 20 passes through condensing lenses 21 and 22, and the light is reflected in mirror 23, and applied to the DMD in DMD unit 9. At this time, the rotation of color wheel 24 and the operation of the DMD are controlled in association for generating time shared images. Main targets of the present invention for dust-proofing are color wheel 24 and light tunnel 20 among these optical components.

Next, a specific structure for implementing dust-proofing will be described.

Figure 4:
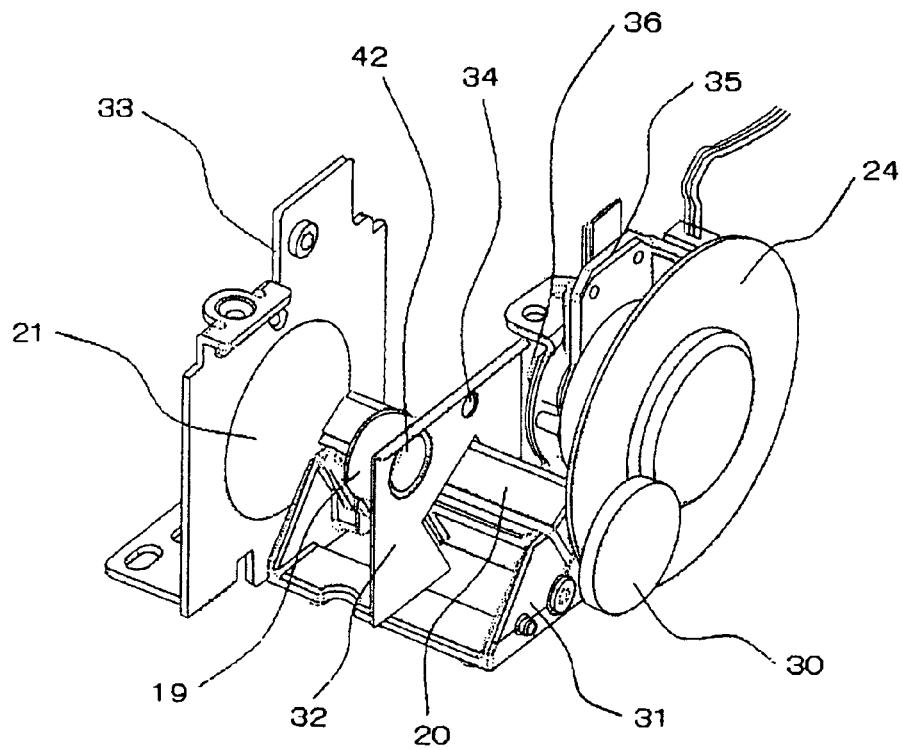
FIG. 4 is a perspective view depicting optical components that present from a glass plate to a condensing lens, which are mounted on the inside of the optical engine according to an embodiment of the present invention, shown from the glass plate side.
Figure 5:
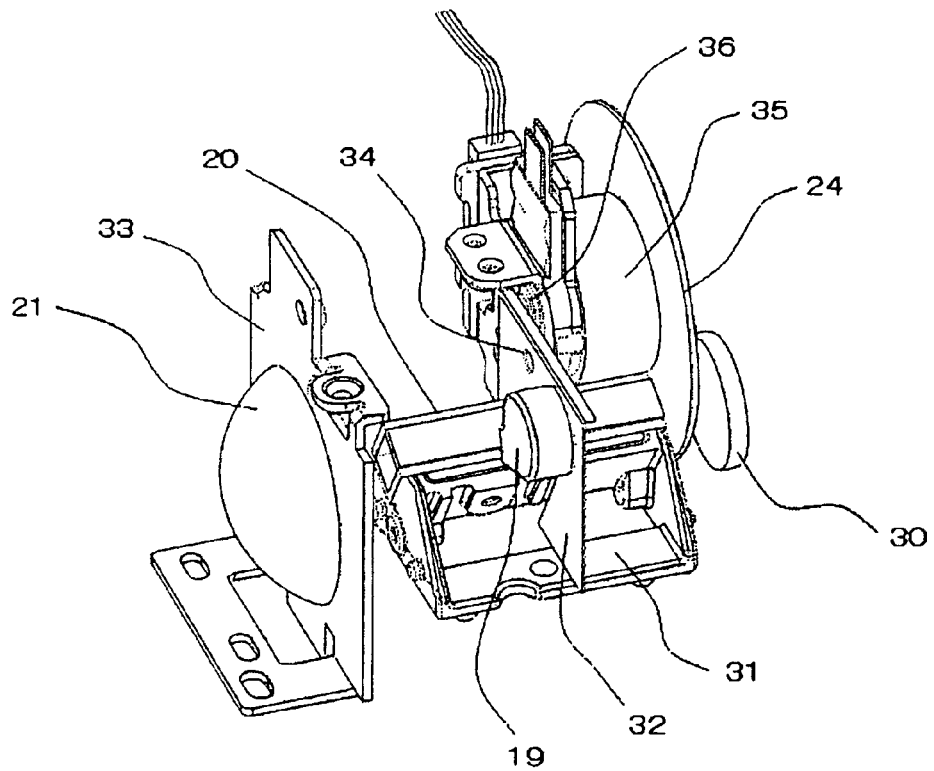
FIG. 5 is a perspective view depicting optical components that present from the glass plate to the condensing lens, which are mounted on the inside of the optical engine according to an embodiment of the present invention, shown from the condensing lens side.

FIGS. 4 and 5 are a perspective view depicting optical components, mounted on the inside of optical engine 7, which present from glass plate 30 to condensing lens 21 shown from the glass plate 30 side, and a perspective view depicting the optical components shown from condensing lens 12 side.

Glass plate 30, color wheel 24, light tunnel 20, and condensing lens 21 are provided successively in this order from the light incident side.

Glass plate 30 is fixed to and held on optical engine base 13. Condensing lens 21 is fixed to condensing lens mounting plate 33, and condensing lens mounting plate 33 is mounted on optical engine base 13 in such a way that condensing lens mounting plate 33 can adjust condensing lens 21 side to side.

The gap between condensing lens mounting plate 33 and optical engine base 13 was formed in such a way that ribs (not shown) that extend from the side surface of optical engine base 13 are alternately added to create almost no gap. With so many possibilities, it is also possible to completely fill the gap with a sponge or the like having high heat-resisting properties instead of these ribs.

Partition plate 32 that separates an enclosed space on the color wheel 24 side from an enclosed section on the condensing lens 21 side is mounted on optical engine base 13.

Light tunnel 20 is mounted on light tunnel adjustment base 31, and held thereon so as to adjust positions both top and bottom, left and right. Partition plate 32 has an opening defined therein through which light tunnel 20 penetrates the plate. Moreover, sirocco fan 19 holds partition plate 32. Partition plate 32 has air intake port 42 defined therein through which sirocco fan 19 admits the air in the inside of the enclosed space on the color wheel 24 side, and ventilation hole 34 defined therein through which the air after evacuated moves from the enclosed section on the condensing lens 21 side to the inside of the enclosed space on the color wheel 24 side.

In addition, color wheel 24 is mounted on color wheel motor 35, and rotated at high speed about color wheel motor shaft 36 in association with the DMD. Sirocco fan 19 blows the admitted air toward light tunnel 20.

Figure 6:
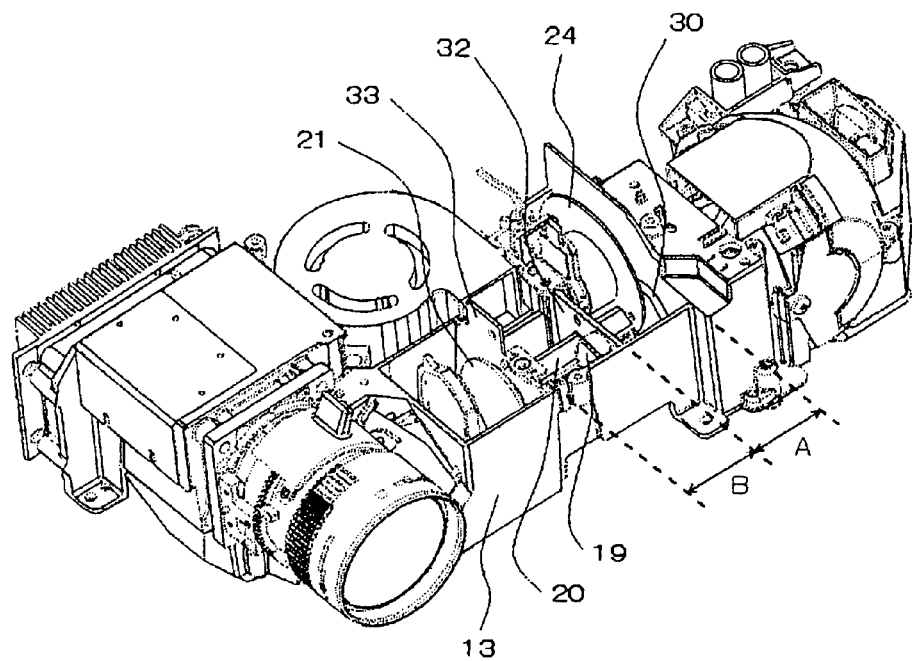
FIG. 6 is an enlarged perspective view depicting optical components that present from the glass plate that light emitted from a lamp unit first enters, to the condensing lens in an embodiment of the present invention.
Figure 7:
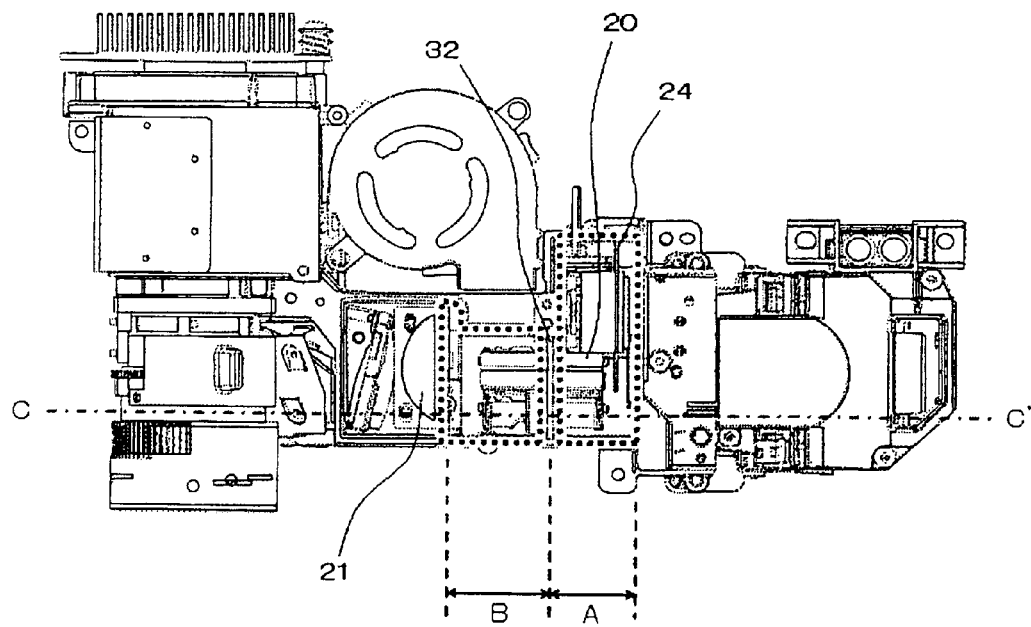
FIG. 7 is an enlarged top view depicting optical components that present from the glass plate that light emitted from the lamp unit first enters, to the condensing lens in an embodiment of the present invention.

FIGS. 6 and 7 are an enlarged perspective view and an enlarged top view depicting optical components that present from glass plate 30 that the light emitted from lamp unit 6 first enters, to condensing lens 21 in optical engine 7 shown in FIG. 2.

The section from plate-shaped structure holding glass plate 30 (the right end of A in FIGS. 5 and 6) to condensing lens mounting plate 33 (the left end of B in FIGS. 5 and 6) forms the enclosed space, and partition plate 32 that penetrates light tunnel 20 defines the inside (the section is limited to sections surrounded by dotted lines shown in FIG. 7).

More specifically, both of color wheel 24 and light tunnel 20, the surface of glass plate 30 on the outgoing side, and the surface of condensing lens 21 on the incident side are dust-proofed.

Although the purpose is to entirely dust-proof color wheel 24 and light tunnel 20, light become blocked when color wheel 24 and light tunnel 20 are covered with the structure. Thus, color wheel 24 and light tunnel 20 are entirely shielded while the light is allowed to pass by using glass plate 30 and condensing lens 21 for a part of the barrier. On partition plate 32, sirocco fan 19 is mounted for circulating the air in the inside of the enclosed space.

Figure 8:
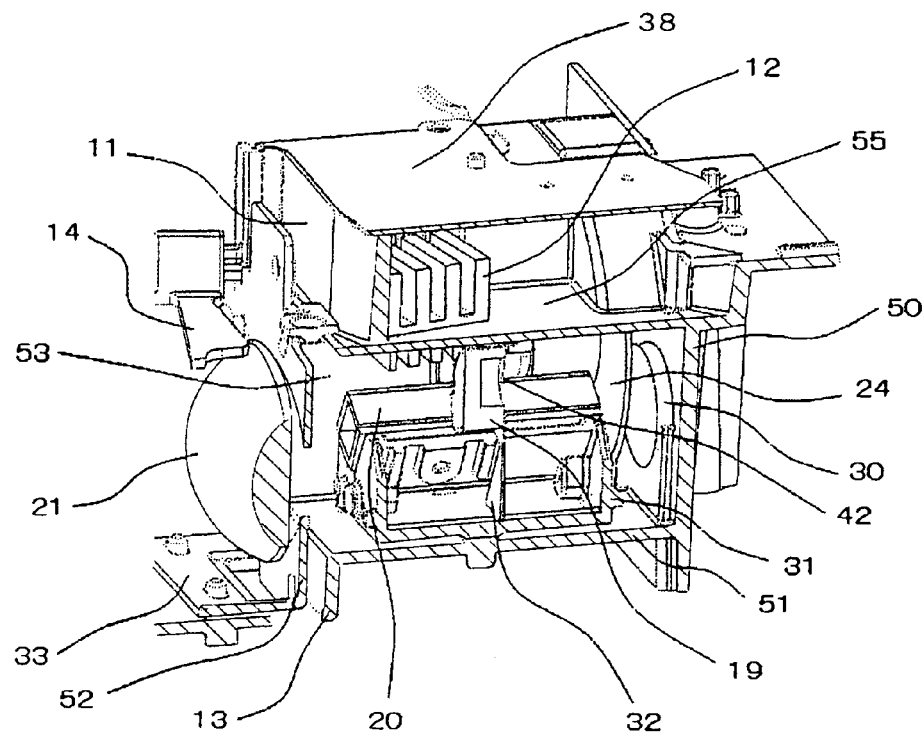
FIG. 8 is a perspective view depicting the optical engine cut in a C-C' cross section shown in FIG. 7.

FIG. 8 is a perspective view depicting optical engine 7 cut in a C-C' cross section shown in FIG. 7. The light incident on glass plate 30 about optical axis 37 (see FIG. 9) passes through color wheel 24 that is rotated and driven at high speed by color wheel motor 35 in association with the DMD, and then enters light tunnel 20.

Light tunnel 20 is held on light tunnel adjustment base 31, and fixed to the bottom part of optical engine base 13 in such a way that light tunnel 20 is laterally adjustable. In light tunnel 20, the incident light repeats internal reflection for a plurality of times and then becomes uniformized. The uniformized light enters condensing lens 21, and goes out and then reaches condensing lens 22.

In the present invention, in order to entirely dust-proof color wheel 24 and light tunnel 20, they are dust-proofed by providing a casing in such a way that they are enclosed with a plate-shaped shielding structure, and a cover (upper cover) is provided from above a box-shaped space for creating an almost perfectly enclosed space.

The plate-shaped shielding structure refers to wall surface 50 of optical engine base 13 forming a face almost vertical to optical axis 37, wall surface 51 that is the bottom part of optical engine base 13, wall surface 52 of condensing lens mounting plate 33 forming a face almost vertical to optical axis 37, two wall surfaces 53 and 54 of optical engine base 13 faced to each other (they are not shown because of the cross section), and wall surface 55 that forms duct 11 and is also the upper cover of color wheel 24 (it is a part of optical engine cover 14).

These six wall surfaces create the enclosed space having color wheel 24 and light tunnel 20 thereinside. Among these wall surfaces, glass plate 30 forms a part of wall surface 50, and condensing lens 21 forms a part of wall surface 52. The reason why glass plate 30 and condensing lens 21 form a part of the wall surfaces is that the light about optical axis 37 is allowed to pass with no attenuation.

As a result, the surface of glass plate 30 on the light emitting side and the surface of condensing lens 21 on the light incident side are in the inside of the enclosed space and dust-proofed. This enclosed space is roughly divided into two sections by partition plate 32 on which sirocco fan 19 is mounted.

On wall surface 55 that forms duct 11, aluminum heat exchanger 12 is provided, which is a heat sink whose upper and lower part are in a fin shape. In heat exchanger 12, the fin-shaped portion on the lower side absorbs the heat of the air whose temperature has increased in the inside of the enclosed space, and the upper fin-shaped portion dissipates heat by heat transfer. The upper fin-shaped portion is in the passage surrounded by duct 11 and duct cover 38, which is cooled by an air blow delivered from sirocco fan 19 to lamp unit 6 for heat dissipation.

Figure 9:
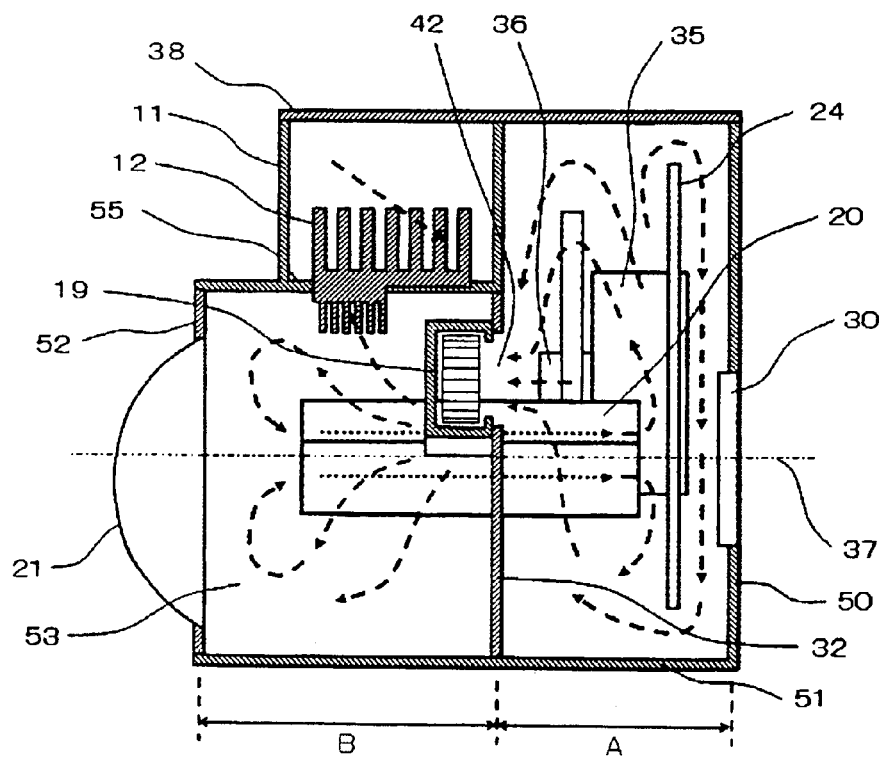
FIG. 9 is a schematic diagram depicting the perspective view shown in FIG. 8, which is a diagram schematically depicting optical components that present from the glass plate that light emitted from the lamp unit first enters, to the condensing lens.

FIG. 9 is a schematic diagram depicting the perspective view shown in FIG. 8. The flow of tempering air in the inside of the enclosed structure will be described with reference to this drawing. In FIG. 9, components not directly involved in cooling are omitted such as light tunnel adjustment base 31. More specifically, only heat generating components and structural members directly involved in dust-proofing and cooling are shown.

The targets for dust-proofing are as follows: color wheel 24; color wheel motor 35 and color wheel motor shaft 36 that is the motor shaft of color wheel motor 35; entire light tunnel 20; and the light emitting side of glass plate 30 and the light incident side of condensing lens 21. In addition, there is also entirely dust-proofed sirocco fan 19 mounted on partition plate 32 that divides the enclosed space in the inside into two sections. Although temperature rises occur in all of these components due to self-heating or optical absorption, these temperature rises are considerable in light tunnel 20, color wheel 24, color wheel motor 35, and color wheel motor shaft 36. In this embodiment, tempering air efficiently circulates in order to cool all these components while the cooling of light tunnel 20 takes top priority.

In other words, the discharged airflow from sirocco fan 19 is directly blown to light tunnel 20, and the entire air in the inside of enclosed space B is stirred. The temperature is uniformized by stirring the internal air, and this accelerates heat dissipation from shielding wall surfaces 51, 52, 53, 54, and 55, or heat transfer to the lower fin shape of heat exchanger 12. Heat exchanger 12 transfers heat absorbed from the lower fin shape to the upper fin shape, and heat exchanger 12 is cooled and the heat is dissipated by the air blow flowing through the passage formed of duct 11 and duct cover 37.

The air that is stirred in the inside of enclosed space B passes through the inside of light tunnel 20, and moves to the inside of enclosed space A. At this time, the inner wall of light tunnel 20 is cooled, an airflow at an increased wind velocity issues toward color wheel 20, and the airflow blows against the light condensing portion of color wheel 20 for cooling. The tempering air, which blows and changes the direction, spreads toward the surroundings to stir the air in the inside of enclosed space B. This spread airflow cools color wheel motor 35 and color wheel motor shaft 36.

Finally, the tempering air in the inside of enclosed space A passes through air intake port 42 provided in partition plate 32, and the tempering air is sucked into sirocco fan 19, and again blown to light tunnel 20.

With a series of these operations, all the components are effectively cooled while the cooling of light tunnel 20 takes top priority. In addition, even in the case where sirocco fan 19 is rotated at high speed to increase cooling performance, noise is considerably small because sirocco fan 19 is in the inside of the enclosed space.

The configuration above is the first embodiment. Moreover, in this embodiment, in order to dissipate heat through the use of heat exchanger 12 having an upper fin shape, air that is blown and that flows through the inside of the passage formed of duct 11 and duct cover 37 is used. However, it is also possible that the upper fin shape is provided on the outside of the duct and heat is dissipated in the inside of the device. Furthermore, heat exchanger 12 that has a lower fin shape is provided only in the inside of enclosed space B. However, it is also possible that the lower fin shape is extended in the right direction and provided in the inside of enclosed space A. In the case where the lower fin shape is provided in both of the insides of enclosed spaces A and B, heat exchange performance is increased. On the other hand, it is also possible that heat exchanger 12 is not provided and heat dissipation is performed only using the shielding wall surfaces forming the enclosed space (for example, wall surfaces 54, 54, 55, and the like).

Second Embodiment

Figure 10:
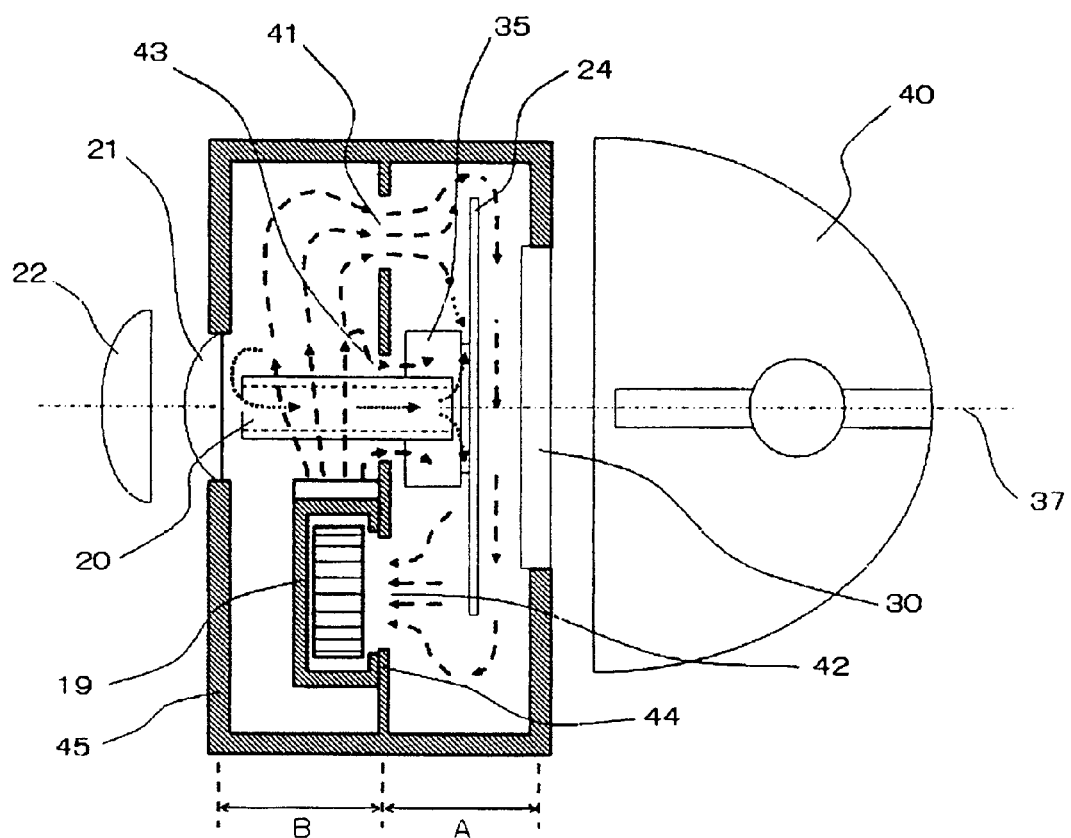
FIG. 10 is a schematic diagram depicting a second embodiment of the present invention.

FIG. 10 is a schematic diagram depicting a second embodiment of the present invention. This is an example in which the internal structure of the first embodiment is modified (more particularly, a cross sectional view of FIG. 9).

In this embodiment, heat exchanger 12 is not provided, and the heat of the air in the inside of the enclosed space is dissipated to the outside of the enclosed space only by heat dissipation from the shielding wall surfaces. Although the point is the same as in the first embodiment in that sirocco fan 19 blows tempering air to light tunnel 20, a part of the tempering air after having been blown partially passes through the inside of light tunnel 20, and the rest moves to enclosed space A through ventilation hole 41, and opening (ventilation gap) 43 provided on the upper part. The diameter of ventilation hole 41 and the gap between the circumferential end surface of opening 43 and the outer surface of light tunnel 20 are small, and as a result, tempering air at an accelerated wind velocity blows against the surface of color wheel 24. Although this point is also similar to the first embodiment, the flow of the entire tempering air flowing in the inside of the enclosed space greatly circulates clockwise in FIG. 10.

Because of this, heat is efficiently dissipated from the shielding wall surfaces to the space in the inside of the device on the outer side.

Third Embodiment

Figure 11:
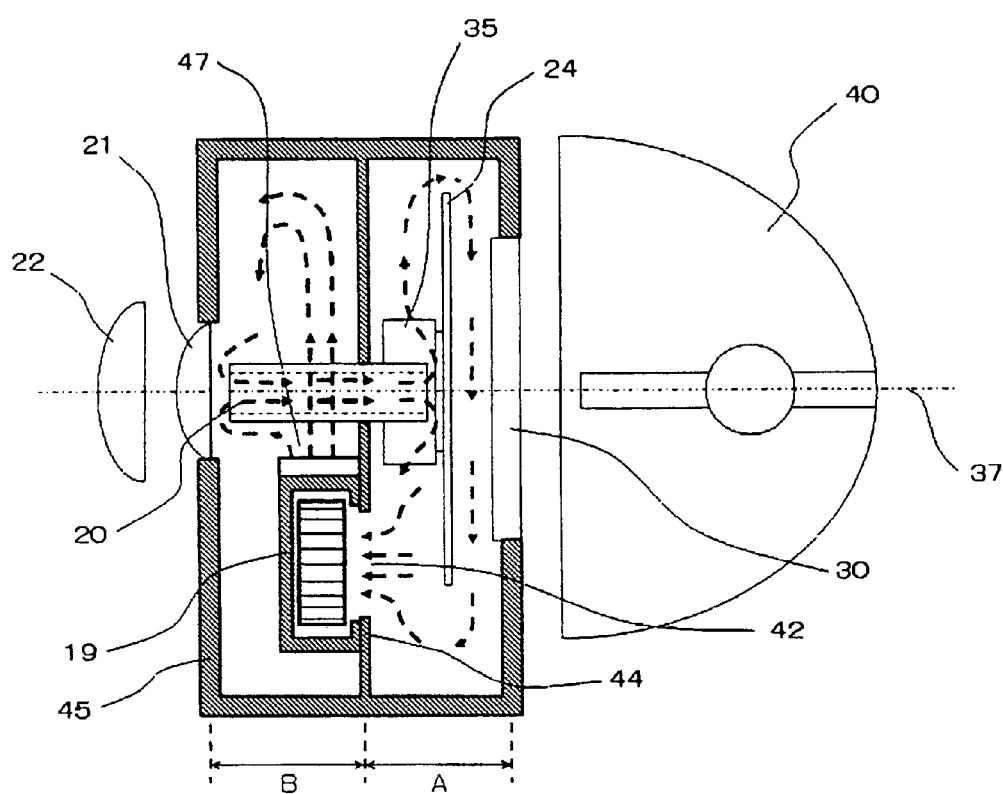
FIG. 11 is a schematic diagram depicting a third embodiment of the present invention

FIG. 11 is a schematic diagram depicting a third embodiment of the present invention. This is an embodiment in which the internal structure of the first embodiment is modified (more particularly, a cross sectional view of FIG. 9).

In this embodiment, heat exchanger 12 is not provided, and the heat of the air in the inside of the enclosed space is dissipated to the outside of the enclosed space only by heat dissipation from the shielding wall surfaces. Although the overall flow of tempering air in the inside of the enclosed space is almost the same as that in the first embodiment, in this embodiment, ventilation hole 41 and opening 43 as shown in FIG. 9 are not provided, and the cooling of the motor shaft in the center takes priority over the outer circumference of color wheel 24. In other words, all the tempering air after having been blown to light tunnel 20 by sirocco fan 19 passes through the inside of light tunnel 20, and the air first blows against the motor shaft in the center of color wheel 24 in enclosed space A.

Fourth Embodiment

Figure 12:
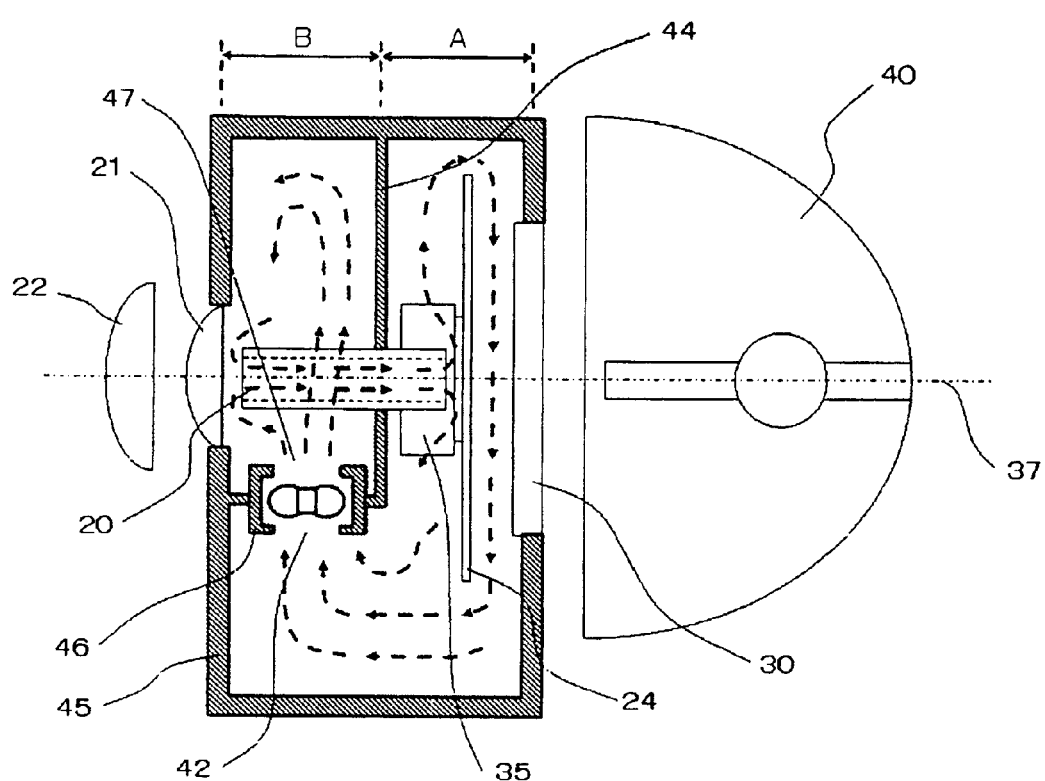
FIG. 12 is a schematic diagram depicting a fourth embodiment of the present invention.

FIG. 12 is a schematic diagram depicting a fourth embodiment of the present invention.

Although the flow of tempering air in the inside of the enclosed space is almost the same as that in the third embodiment, the point is different in that axial flow fan 46 is used for the cooling fan. In other words, in this embodiment, axial flow fan 46 is used to increase the wind velocity of an airflow blowing against light tunnel 24, so that the circulating air quantity in enclosed spaces A and B is increased. It is possible to suppress overall temperature rises in a plurality of components by increasing the circulating air quantity.

Fifth Embodiment

Figure 13:
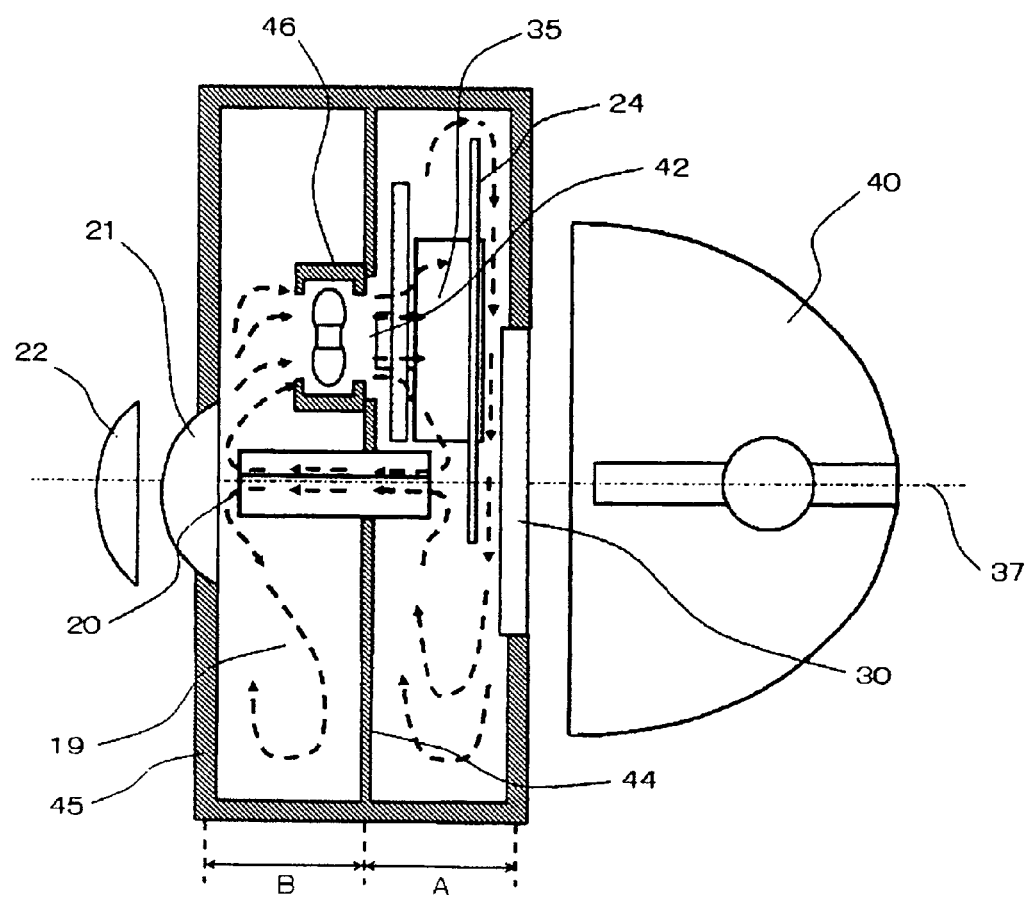
FIG. 13 is a schematic diagram depicting a fifth embodiment of the present invention.

FIG. 13 is a schematic diagram depicting a fifth embodiment of the present invention. Although in the first to fourth embodiment, light tunnel 24 is preferentially cooled, in this embodiment, the color wheel motor shaft is preferentially cooled.

In this embodiment, axial flow fan 46 is provided above optical axis 37 of enclosed space B, and the air outlet port of axial flow fan 46 and ventilation hole 41 provided in partition plate 44 are provided near motor shaft 36 of color wheel 24. Because of this, the air that is blown by axial flow fan 46 directly blows against motor shaft 36 of color wheel 24 and color wheel motor 35. Since the color wheel motor is rotated at around 8,000 rpm at high speed, the temperature of the bearing becomes high. It is possible to prolong the component lifetime of color wheel motor 35 by cooling this bearing.

The tempering air after blown to motor shaft 36 and color wheel motor 35 circulates in enclosed space A clockwise, passes through the inside of light tunnel 20, and again moves to enclosed space B on the air intake port side of axial flow fan 46. In this manner, light tunnel 20 is also cooled.

Sixth Embodiment

Figure 14:
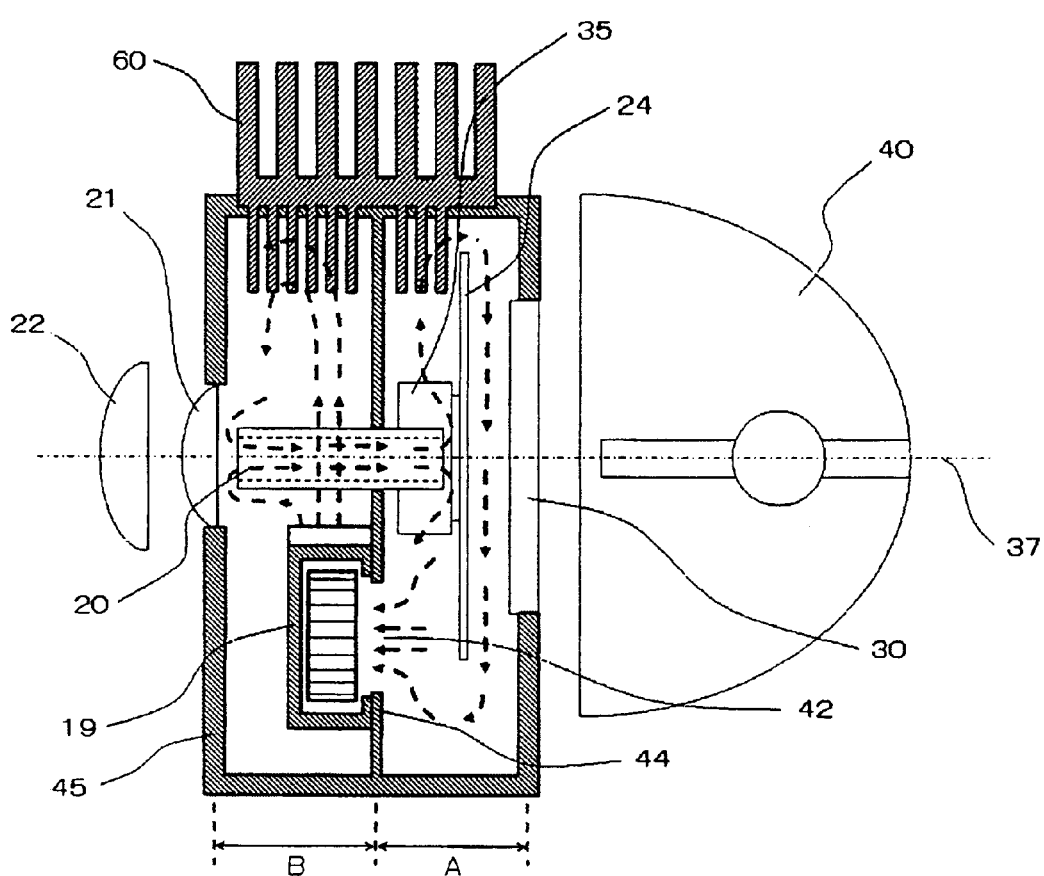
FIG. 14 is a schematic diagram depicting a sixth embodiment of the present invention.

FIG. 14 is a schematic diagram depicting a sixth embodiment of the present invention.

In this embodiment, aluminum heat exchanger 60 is provided on the upper part of casing 45 in the third embodiment shown in FIG. 11. Heat exchanger 60 has fin shapes on the outer side of casing 45 and in internal spaces A and B on the inner side, and it can efficiently dissipate the heat of the air in the insides of enclosed spaces A and B to the outside.

Seventh Embodiment

Figure 15:
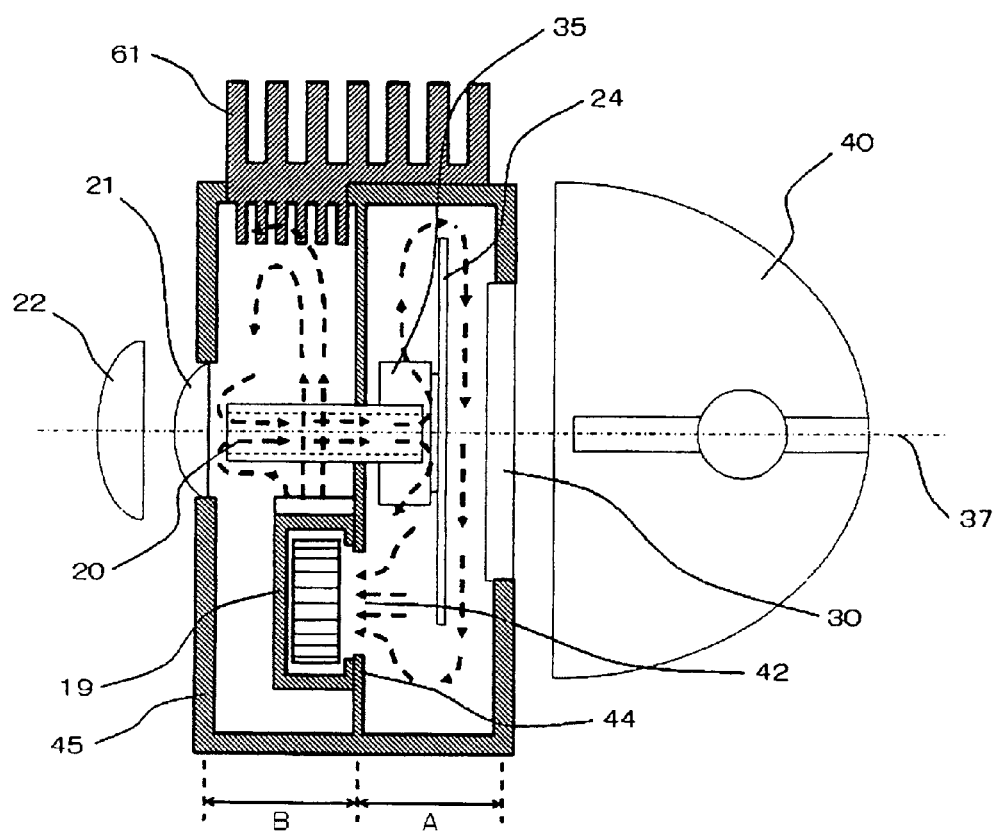
FIG. 15 is a schematic diagram depicting a seventh embodiment of the present invention.

FIG. 15 is a schematic diagram depicting a seventh embodiment of the present invention.

In this embodiment, although aluminum heat exchanger 60 is provided on the upper part of casing 45 in the third embodiment shown in FIG. 11, the heat radiating fin of the heat exchanger is provided only in the inside of enclosed space B as compared with the sixth embodiment. Although heat exchange performance is excellent in the sixth embodiment, the space to accommodate the color wheel is increased more than that in the sixth embodiment because the heat radiating fin is not provided in enclosed space A.

Eighth Embodiment

Figure 16:
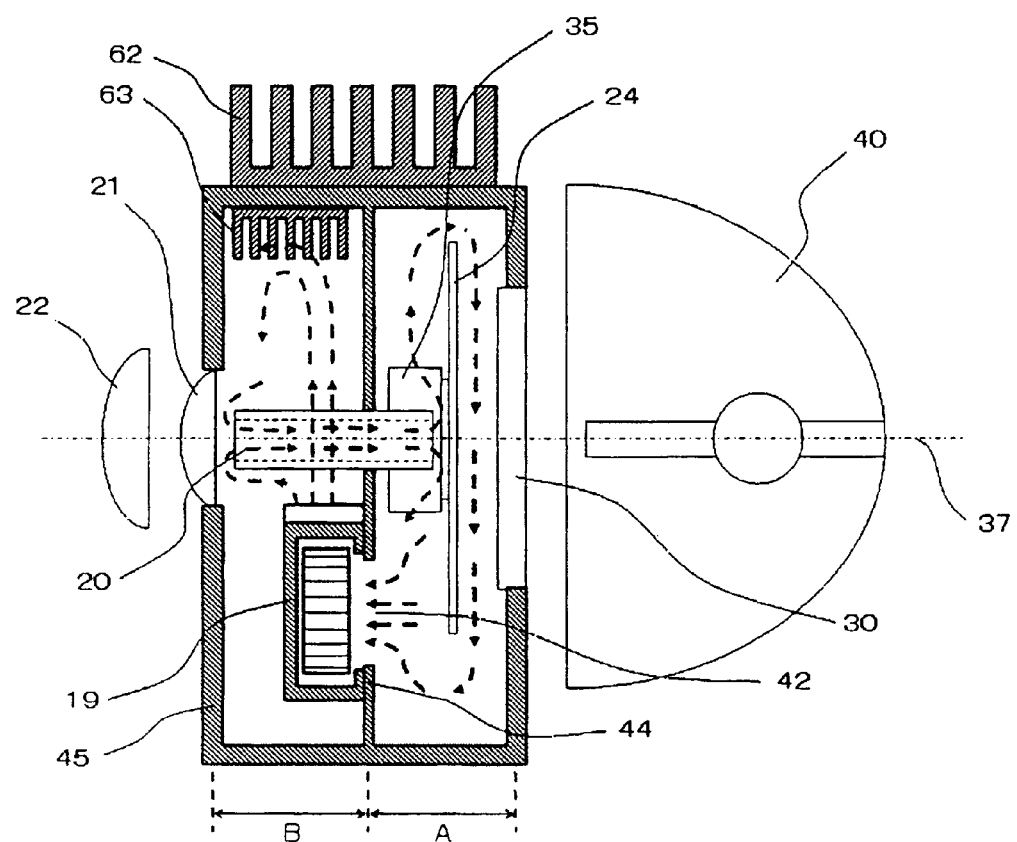
FIG. 16 is a schematic diagram depicting an eighth embodiment of the present invention.

FIG. 16 is a schematic diagram depicting an eighth embodiment of the present invention.

In this embodiment, heat exchanger 61 shown in the seventh embodiment in FIG. 15 is divided into two for heat sink 62 provided on the outer side of the upper part of casing 45 and heat sink 63 provided in the inside of enclosed section B of casing 45.

In the seventh embodiment shown in FIG. 15, an opening is formed in the wall in the upper part of casing 45, the opening through which the heat dissipation structure (heat radiating fin) on the lower side of heat exchanger 61 is passed. In contrast to this, casing 45 of this embodiment is in the enclosed state.

More specifically, in manufacture of the optical engine, internal components are assembled in advance in a highly clean environment, and they are enclosed with casing 45. After that, this optical engine is assembled in the device, and then heat sink 62 is mounted. Although the effectiveness of the heat exchanger between the inside and outside of the enclosed space is lower than that of the seventh embodiment because the wall of casing 45 exists between heat sink 63 and heat sink 62, there is an advantage in which dust particles or the like do not tend to enter in manufacture.

Ninth Embodiment

Figure 17:
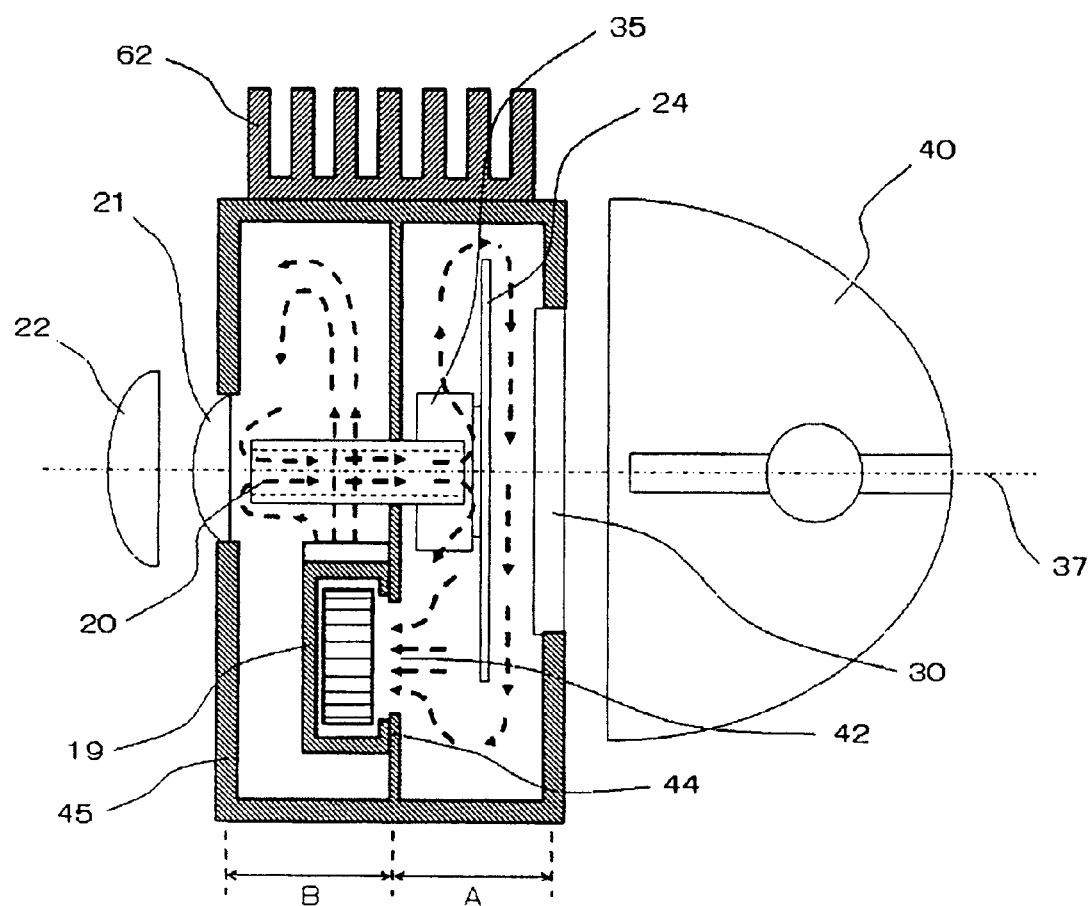
FIG. 17 is a schematic diagram depicting a ninth embodiment of the present invention.

FIG. 17 is a schematic diagram depicting a ninth embodiment. In this embodiment, aluminum heat sink 62 is provided only on the outer side of casing 45 in the third embodiment shown in FIG. 17. Although heat exchange performance is lower than that in any of the sixth to eighth embodiments, in this embodiment, it is possible to retrofit the heat sink as necessary.

Tenth Embodiment

Figure 18:
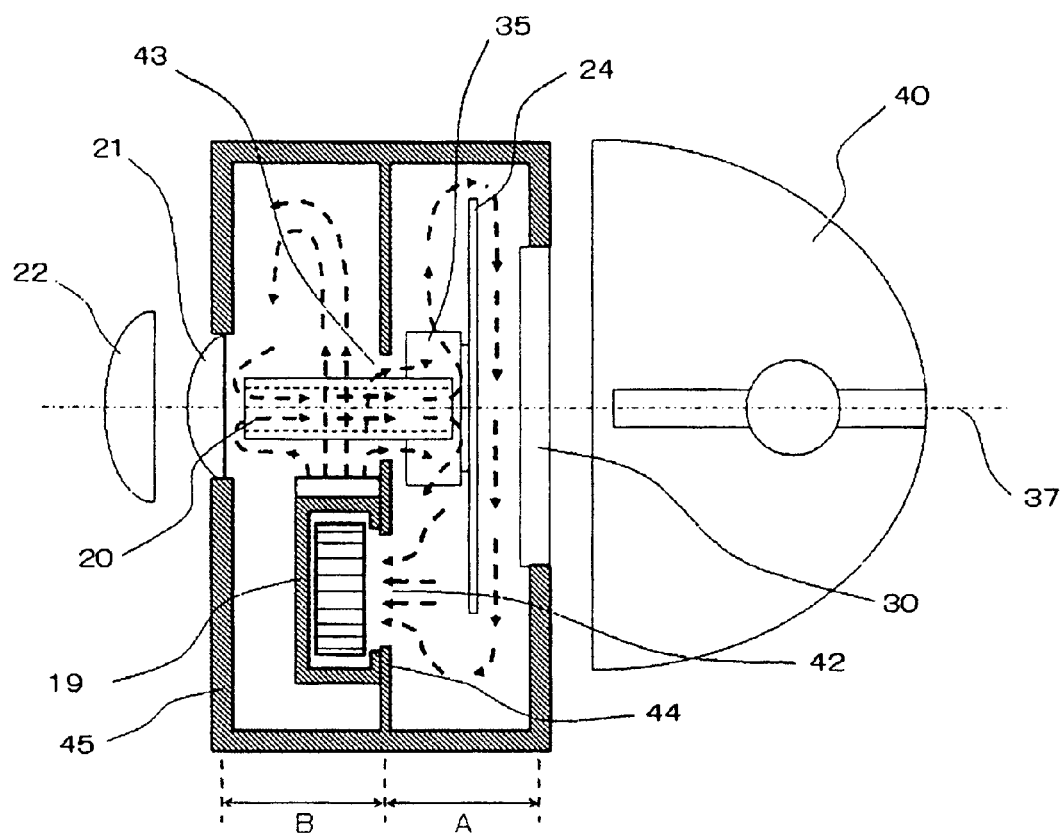
FIG. 18 is a schematic diagram depicting a tenth embodiment of the present invention.

FIG. 18 is a schematic diagram depicting a tenth embodiment of the present invention.

In this embodiment, opening 43 in partition plate 44, through which light tunnel 20 penetrates, is secured largely in the third embodiment shown in FIG. 11. Because of this, tempering air passes from internal space B to internal space A along the outer wall of light tunnel 20. The tempering air having passed through opening 43 blows against color wheel 24 with tempering air having passed through the inside of light tunnel 20 so as to surround their periphery. In the third embodiment, tempering air does not actively blow against the outer wall of light tunnel 20 on the enclosed section A side, whereas in this embodiment, tempering air blows thereagainst and also contributes to cooling color wheel 24.

Eleventh Embodiment

Figure 19:
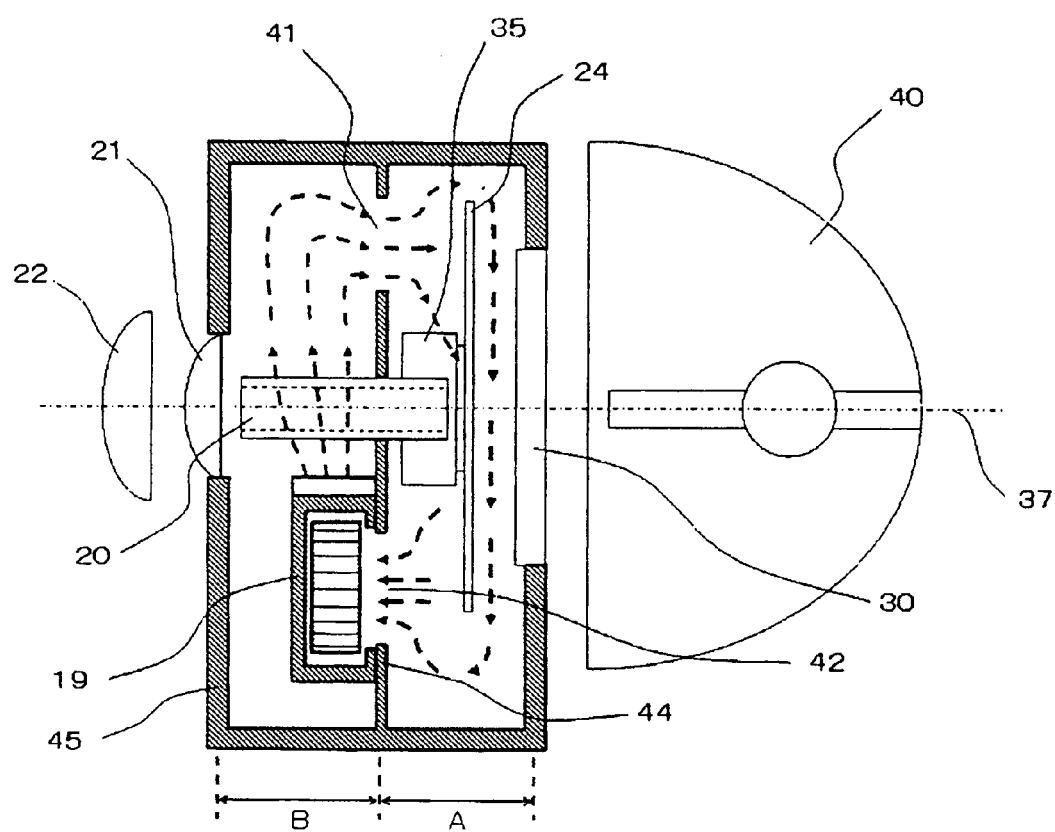
FIG. 19 is a schematic diagram depicting an eleventh embodiment of the present invention.

FIG. 19 is a schematic diagram depicting an eleventh embodiment of the present invention.

In this embodiment, ventilation hole 41 is provided in the upper part of partition plate 44 in the inside of casing 45 in the third embodiment shown in FIG. 11, and more particularly, ventilation hole 41 is provided at a position that faces to air intake port 42 of sirocco fan 19 so as to sandwich light tunnel 20 between ventilation hole 41 and air intake port 42. In addition, in this embodiment, opening 43 as a ventilation gap is not provided like that in the tenth embodiment.

In this embodiment, tempering air is not actively delivered to the inside of light tunnel 20, and a flow of airflow widely circulating in the inside of the enclosed space is guided to cool color wheel 24 and light tunnel 20 entirely. More specifically, the tempering air blowing from the air outlet port of sirocco fan 19 cools the outer wall of light tunnel 20, and then moves to enclosed space A from the upper part of enclosed space B through ventilation hole 41. In enclosed space A, after the tempering air cools color wheel 20, color wheel motor 35, or the like in the flow from the upper to lower part of enclosed space A, the tempering air is admitted to sirocco fan 19 through ventilation port 42, and then again blows out of the air outlet port of sirocco fan 19.

Twelfth Embodiment

Figure 20:
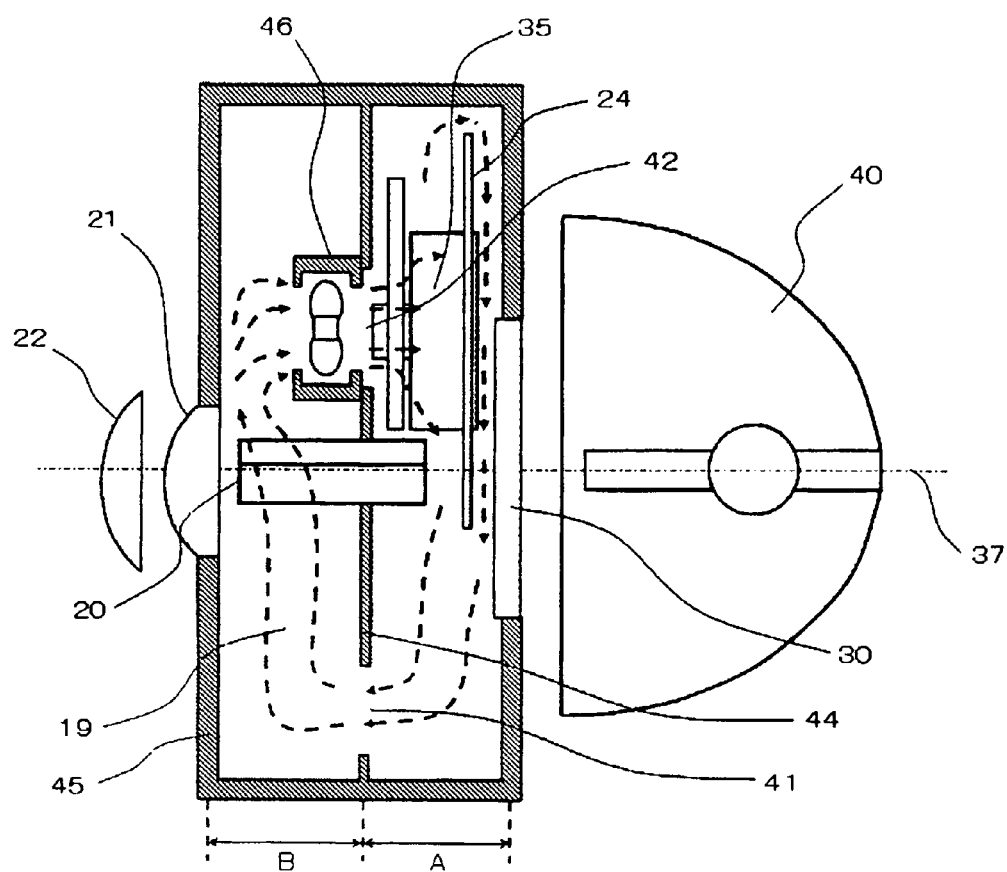
FIG. 20 is a schematic diagram depicting a twelfth embodiment of the present invention.

FIG. 20 is a schematic diagram depicting a twelfth embodiment of the present invention.

In this embodiment, ventilation hole 41 is provided in the lower part of partition plate 44 in the inside of casing 45 in the fifth embodiment shown in FIG. 13, and more particularly, ventilation hole 41 is provided at a position that faces air outlet port 42 of axial flow fan 46 so as to sandwich light tunnel 20 between ventilation hole 41 and air outlet port 42.

In this embodiment, tempering air is not actively delivered to the inside of light tunnel 20, and the flow of air widely circulating in the inside of the enclosed space is guided to completely cool color wheel 24 and light tunnel 20 similar to the eleventh embodiment shown in FIG. 19.

More specifically, the tempering air blown out of air outlet port 42 of axial flow fan 46 cools color wheel motor shaft 36 and color wheel motor 35, and then cools color wheel 24 by the air that flows from the upper to lower part of enclosed space A. After that, the tempering air moves from the lower part of enclosed space A to enclosed space B through ventilation hole 41 provided in the lower part in the inside of enclosed space A. In enclosed space B, light tunnel 20 is cooled by the flow of tempering air from the lower toward upper part, the tempering air is admitted from the air intake port of axial flow fan 46, and the tempering air again blows out of the air outlet port of axial flow fan 46.

Thirteenth Embodiment

Figure 21:
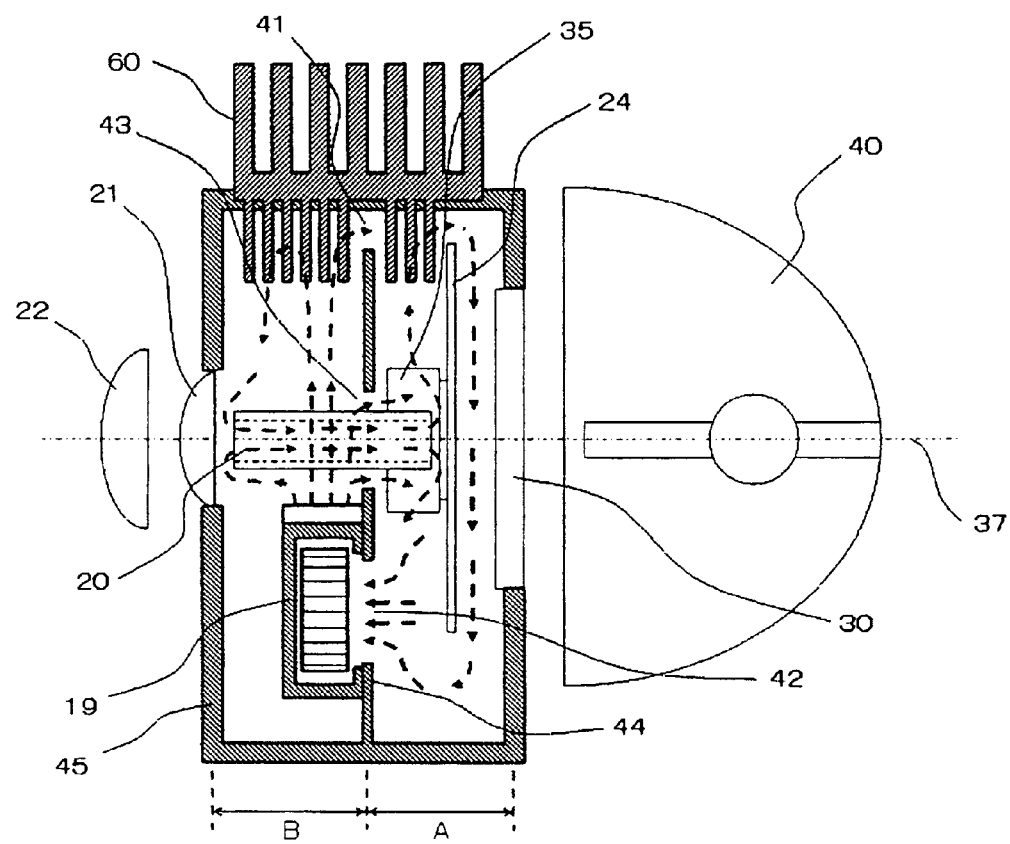
FIG. 21 is a schematic diagram depicting a thirteenth embodiment of the present invention.

FIG. 21 is a schematic diagram depicting a thirteenth embodiment of the present invention.

Although a heat exchanger in this embodiment is similar to that in the sixth embodiment shown in FIG. 14, the flow of tempering air in the inside of the enclosed space is different from that in the sixth embodiment. The flow of tempering air in the inside of the enclosed space is a flow that can cool the outer wall of light tunnel 20 by increasing opening 43 as similar to the second embodiment (FIG. 10) and the tenth embodiment (FIG. 18).

Furthermore, on the upper side of partition plate 44, ventilation hole 41 is provided near the lower fin-shaped portion of heat exchanger 60 for creating a flow of tempering air. The flow of tempering air from enclosed space B to enclosed space A is produced by this opening, and the lower fin-shaped portion of heat exchanger 60 is cooled to accelerate heat transfer to the outside of casing 45.

Fourteenth Embodiment

Figure 22:
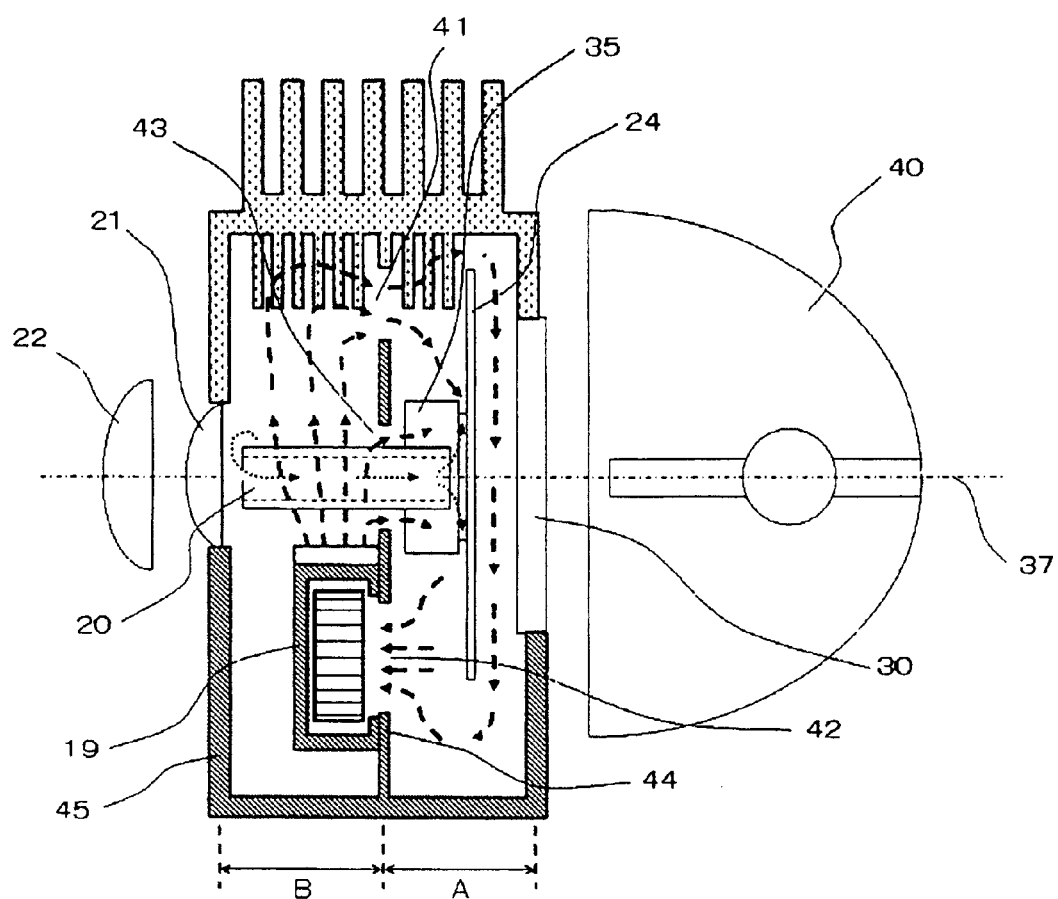
FIG. 22 is a schematic diagram depicting a fourteenth embodiment of the present invention.

FIG. 22 is a schematic diagram depicting a fourteenth embodiment of the present invention.

In this embodiment, heat exchanger 60 and the upper part of casing 45 are integrally shaped by aluminum die casting in the thirteenth embodiment.

Because heat exchanger 60 is integrally formed with the upper part of casing 45, the heat dissipation area is increased, and the amount of heat dissipation grows. In addition, ventilation hole 41 is further enlarged in order to facilitate the move of the flow of the air in the inside of the enclosed space from enclosed space B to enclosed space A in the upper part of the inside of the enclosed space.

As recited above, in the first to fourteenth embodiments illustrating the present invention, the color wheel is provided on the light source side and the light tunnel is provided on the projection lens side. However, the present invention is not limited to this arrangement. In other words, in the present invention, it is also possible for the light tunnel to be provided on the light source side and for the color wheel to be provided on the projection lens side, and it is possible that a similar effect can be obtained even though the other optical components are provided therebetween.

Moreover, it is possible to prevent the dust particles from becoming attached to the display device according to the embodiments as described above by shielding the color filter and the rod integrator with a plate-shape or box-shaped structure from the surrounding space to form an enclosed space. Furthermore, because the space in which the color filter and the rod integrator are provided is formed in an enclosed space, it is possible to reliably prevent dust particles from attaching, with no entry of dust particles from the outside.

On the other hand, although temperature rises occur in the color filter and the rod integrator due to this enclosure, they are cooled by using a partition plate, provided in the inside of the space, and by efficient circulating the internal air with the cooling fan. At this time, although a temperature rise occurs in the internal air because of heat transferred from the color filter, rod integrator, or the like, the thermal storage of the internal air moves to the outside space for heat dissipation through the plate-shaped or box-shaped structure forming the enclosed space or through the heat exchanger.

In addition, because the enclosed space formed of the plate-shaped or box-shaped structure has a sound insulation effect, almost no noise leaks to the environment even though the cooling fan is rotated at high speed in the inside of the enclosed space. Because of this, it is possible to cool the color filter, rod integrator, or the like by strongly stirring the internal air.

Moreover, because it is unnecessary to provide the air filter in the aforementioned display device according to the foregoing embodiments, there is no possibility of clogging and it is unnecessary to clean and change the air filter.

More specifically, it is possible to implement a highly reliable projection type display device with no reduction in brightness at low noise in which the heat generating components such as the color filter and the rod integrator are reliably protected from the attachment of dust particles while they are being cooled.

In addition, in the foregoing embodiments, the light tunnel that is a hollow rod integrator is used for one of the optical components used for the display device. However, it is possible to use not only the light tunnel but also a rod lens in a solid structure for the configuration in which the opening in the partition plate, through which the rod integrator penetrates, is enlarged to form a ventilation gap.

Although the invention of the present application has been described with reference to exemplary embodiments, the invention of the present application is not limited to the above described exemplary embodiments. The constitution and details of the invention of the present application are open to various modifications within the scope of the invention of the present application that will be clear to anyone of ordinary skilled in the art.

The invention claimed is:

1. A projection type display device comprising:
   a plurality of optical components;
   a structure configured to enclose and accommodate a part of said plurality of optical components therein; and
       a source for blowing air configured to circulate a gas in an inside of said structure; and
   a partition plate having at least a first opening and a second opening defined therein, said partition plate being configured to divide an enclosed space formed by said structure into a plurality of spaces, wherein:
       a part of said optical components comprises a rod integrator and a color wheel supported on a rotation drive shaft; and
       the color wheel supported on said rotation drive shaft is provided in one of said plurality of spaces, and said rod integrator penetrates said first opening in said partition plate and is provided across said plurality of spaces.

2. The projection type display device according to claim 1, wherein a gap through which air is allowed to communicate is formed between an outer surface of said rod integrator and a rim surface of said first opening.

3. The projection type display device according to claim 1, wherein:
   said source for blowing air is mounted on said partition plate; and
   an air intake port of said air blow source communicates with said second opening in said partition plate.

4. The projection type display device according to claim 3, wherein a port through which air is blown out, of said source for blowing air is provided facing the outer surface of said rod integrator.

5. The projection type display device according to claim 1, wherein:
   said source for blowing air is mounted on said partition plate; and
   a blowout port of said air blow source communicates with said second opening in said partition plate.

6. The projection type display device according to claim 5, wherein the port through which air is blown out, of said source for blowing air is provided facing said rotation drive shaft of said color wheel.

7. The projection type display device according to claim 1, wherein said partition plate further has a third opening defined therein at a position on an opposite side of said second opening so as to sandwich said first opening between the second opening and the third opening.

8. The projection type display device according to claim 1, wherein said rod integrator comprises a light tunnel.

9. The projection type display device according to claim 1, wherein a heat exchanger is provided on the wall of said structure.

10. A projection type display device comprising:
    a plurality of optical components;
    a structure configured to enclose and accommodate a part of said plurality of optical components therein;
    a source for blowing air configured to circulate a gas in an inside of said structure; and
    a partition plate having at least a first opening and a second opening defined therein, said partition plate being configured to divide an enclosed space formed by said structure into a plurality of spaces, wherein:
        said plurality of optical components are arranged in a sequence;
    a part of a wall of said structure in a direction of arranging said optical components includes a member configured to transmit light;
    a part of said optical components comprises a rod integrator and a color wheel supported on a rotation drive shaft; and
        the color wheel supported on said rotation drive shaft is provided in one of said plurality of spaces, and said rod integrator penetrates said first opening in said partition plate and is provided across said plurality of spaces.

11. The projection type display device according to claim 2, wherein:
    said source for blowing air is mounted on said partition plate; and
    an air intake port of said air blow source communicates with said second opening in said partition plate.

12. The projection type display device according to claim 2, wherein:
    said source for blowing air is mounted on said partition plate; and
    a blowout port of said air blow source communicates with said second opening in said partition plate.

13. The projection type display device according to claim 2,
    wherein said partition plate further has a third opening defined therein at a position on an opposite side of said second opening so as to sandwich said first opening between the second opening and the third opening.

14. The projection type display device according to claim 3,
    wherein said partition plate further has a third opening defined therein at a position on an opposite side of said second opening so as to sandwich said first opening between the second opening and the third opening.

15. The projection type display device according to claim 4,
    wherein said partition plate further has a third opening defined therein at a position on an opposite side of said second opening so as to sandwich said first opening between the second opening and the third opening.

16. The projection type display device according to claim 5,
   wherein said partition plate further has a third opening defined therein at a position on an opposite side of said second opening so as to sandwich said first opening between the second opening and the third opening.

17. The projection type display device according to claim 6,
   wherein said partition plate further has a third opening defined therein at a position on an opposite side of said second opening so as to sandwich said first opening between the second opening and the third opening.

18. The projection type display device according to claim 2,
   wherein said rod integrator comprises a light tunnel.

* * * * *